United States Patent
Sekizawa et al.

(10) Patent No.: US 11,034,356 B2
(45) Date of Patent: Jun. 15, 2021

(54) TIRE-MOUNTED SENSOR AND ROAD SURFACE CONDITION ESTIMATION APPARATUS INCLUDING THE SAME

(71) Applicant: DENSO CORPORATION, Kariya (JP)

(72) Inventors: Takatoshi Sekizawa, Kariya (JP); Ryosuke Kanbayashi, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/243,113

(22) Filed: Jan. 9, 2019

(65) Prior Publication Data

US 2019/0143987 A1 May 16, 2019

Related U.S. Application Data

(63) Continuation of application No. PCT/JP2017/023192, filed on Jun. 23, 2017.

(30) Foreign Application Priority Data

Jul. 13, 2016 (JP) .............................. JP2016-138653

(51) Int. Cl.
*B60W 40/06* (2012.01)
*B60C 19/00* (2006.01)
(Continued)

(52) U.S. Cl.
CPC .............. *B60W 40/06* (2013.01); *B60C 19/00* (2013.01); *G01H 1/00* (2013.01); *G01H 1/003* (2013.01);
(Continued)

(58) Field of Classification Search
None
See application file for complete search history.

(56) References Cited

U.S. PATENT DOCUMENTS 7,243,534 B2 * 7/2007 Ogawa .................. B60T 8/1725
73/146
9,701,287 B2 * 7/2017 Kretschmann .......... B60T 8/171
(Continued)

FOREIGN PATENT DOCUMENTS

| JP | 2015174636 A | 10/2015 |
|----|--------------|---------|
| JP | 201781380 A  | 5/2017  |
| JP | 201783264 A  | 5/2017  |

OTHER PUBLICATIONS

U.S. Appl. No. 16/083,912, filed Sep. 11, 2018, Sekizawa et al.

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A tire-mounted sensor includes a vibration detector, an acceleration sensor, a signal processor, and a transmitter. The vibration detector outputs a detection signal according to amplitude of a vibration of the tire. The acceleration outputs a detection signal according to an acceleration of the tire in a radial direction. The signal processor detects a rotational angle of the tire reaching a ground angle during each rotation of the tire, sets a measurement period including a time period during which the rotational angle of the tire is at the ground angle, extracts a ground contact section during which the portion of the tread provided with the vibration sensor is in contact with the ground, in the measurement period, and generates a road surface data based on the detection signal output from the vibration detector during the ground contact section. The transmitter transmits the road surface data.

4 Claims, 5 Drawing Sheets

(51) Int. Cl.
*G01H 1/00* (2006.01)
*G01K 13/00* (2021.01)
*G01W 1/00* (2006.01)

(52) U.S. Cl.
CPC .............. *G01K 13/00* (2013.01); *G01W 1/00* (2013.01); *B60C 2019/004* (2013.01); *B60W 2400/00* (2013.01); *B60W 2552/00* (2020.02); *G01K 2205/00* (2013.01)

(56) References Cited

U.S. PATENT DOCUMENTS

| | | | |
|---|---|---|---|
| 2002/0162389 A1* | 11/2002 | Yokota | B60C 23/06 |
| | | | 73/146 |
| 2005/0085987 A1* | 4/2005 | Yokota | B60C 23/0477 |
| | | | 701/80 |
| 2009/0105921 A1* | 4/2009 | Hanatsuka | B60G 17/0165 |
| | | | 701/80 |
| 2016/0303928 A1* | 10/2016 | Benbouhout | B60C 23/064 |
| 2017/0057306 A1 | 3/2017 | Suzuki et al. | |
| 2018/0222458 A1 | 8/2018 | Suzuki et al. | |
| 2018/0364197 A1 | 12/2018 | Suzuki et al. | |

\* cited by examiner

TIRE-MOUNTED SENSOR AND ROAD SURFACE CONDITION ESTIMATION APPARATUS INCLUDING THE SAME

CROSS REFERENCE TO RELATED APPLICATIONS

The present application is a continuation application of International Patent Application No. PCT/JP2017/023192 filed on Jun. 23, 2017, which designated the United States and claims the benefit of priority from Japanese Patent Application No. 2016-138653 filed on Jul. 13, 2016. The entire disclosures of all of the above applications are incorporated herein by reference.

TECHNICAL FIELD

The present disclosure relates to a tire-mounted sensor and a road surface condition estimation apparatus including the same.

BACKGROUND

A road surface condition estimation apparatus detects a vibration of a tire by an acceleration sensor and transmits a detection result of the vibration to a vehicle body.

SUMMARY

The present disclosure provides a tire-mounted sensor configured to generate a road surface data indicating a road surface condition based on a detection signal output from a vibration detector when a rotational angle of a tire reaches a ground angle, and to transmit the road surface data.

BRIEF DESCRIPTION OF DRAWINGS

The above object, the other objects, features, and advantages of the present disclosure will become more apparent from the following detailed description with reference to the accompanying drawings, in which.

DETAILED DESCRIPTION

A road surface condition estimation apparatus typically includes an acceleration sensor on a rear surface of a tire tread. The road surface condition estimation apparatus detects a vibration applied to the tire by the acceleration sensor and transmits a detection result of the vibration to a vehicle body. The road surface condition estimation apparatus estimates a road surface condition based on a detection signal output from a vibration detector included in a tire-mounted sensor. In particular, the level in the high frequency component of the detection signals of the vibration detector changes based on a road surface condition. Therefore, the level of the high-frequency component in the detection signal of the vibration detector in the ground contact section is set as the road surface condition. The ground contact section refers to a situation where the section of a tire tread where the tire-mounted sensor is installed is in contact with the road surface. The level of the high-frequency component in the detection surface is used as road surface data for indicating a road surface condition. Each time the tire makes one rotation, the tire-mounted sensor transmits the road surface condition data to the vehicle side device, and the vehicle side device estimates the road surface condition based on the road surface condition data. Specifically, an integrated voltage value obtained by integrating the high frequency component of the detection signal indicated as a voltage value is employed as the road surface condition data. In this configuration, the vehicle side device estimates a road surface friction coefficient (hereinafter, referred to as a road surface μ) based on the integrated voltage value.

With regard to the above-mentioned road surface condition estimation apparatus, the estimation of the road surface μ is performed based on a vibration in the ground contact section. However, when a traveling road surface has large unevenness such as a gravel road, the vibration caused by a bumpy road surface may be superimposed as noise. Thus, it may be difficult to acquire the vibration in the ground contact section. For this reason, the estimation of the road surface μ may not be accurate.

According to an aspect of the present disclosure, the tire-mounted sensor is mounted to a rear surface of a tread of a tire. The tire-mounted sensor includes a vibration detector, an acceleration sensor, a signal processor and a transmitter. The vibration detector is configured to output a detection signal according to amplitude of a vibration of the tire. The acceleration sensor is configured to output a detection signal according to an acceleration of the tire in a radial direction. The signal processor that is configured to detect a rotational angle of the tire reaching a ground angle in which a portion of the tread provided with the vibration detector is in contact with a ground during each rotation of the tire, set a measurement period including a time period during which the rotational angle of the tire is at the ground angle, extract a ground contact section, which refers to a time period during which the portion of the tread provided with the vibration sensor is in contact with the ground, in the measurement period, and generate a road surface data, which indicates a road surface condition based on the detection signal output from the vibration detector, during the ground contact section. The transmitter is configured to transmit the road surface data.

As described above, the ground contact section is extracted based on a detection signal of the vibration detector only in a period of having a ground contact angle according to a tire's rotational angle. Even though noise of vibration, which is caused by a bumpy road surface, may be superimposed to a detection signal of the vibration detector, it is possible to suppress erroneous determination on the ground contact section. Thus, it may be possible to suppress an erroneous determination on the ground contact section even when a vehicle travels on a bumpy road surface.

Hereinafter, embodiments of the present disclosure will be described with reference to the drawings. In the following embodiments, the same or equivalent parts are denoted by the same reference numerals.

First Embodiment

A road surface condition estimation apparatus 100 including a tire-mounted sensor 1 according to the present embodiment will be described with reference to FIG. 1 to FIG. 9. The road surface condition estimation apparatus according to the present embodiment is employed to estimate a road surface condition based on a vibration in a contact surface of a tire attached to each of wheels of the vehicle.

Figure 1:
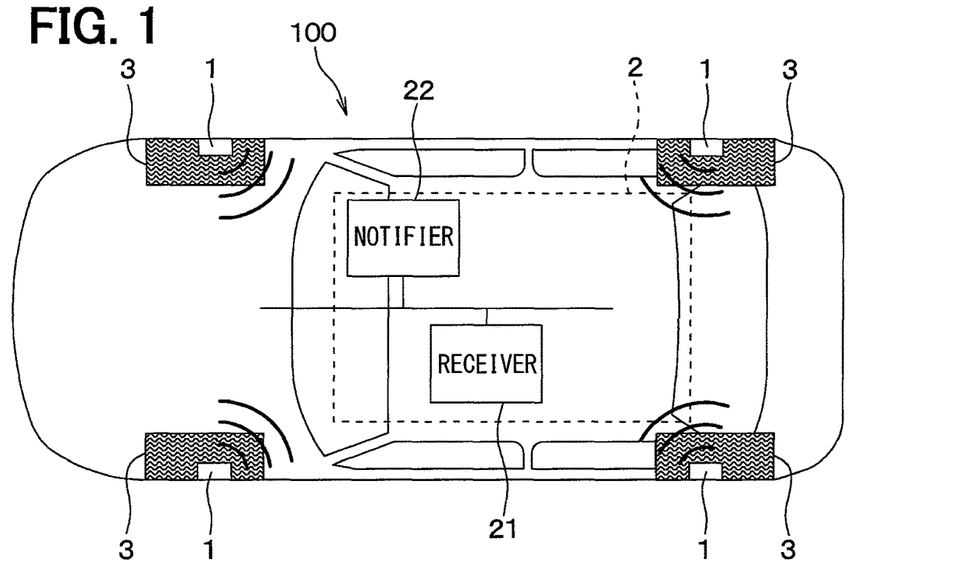
FIG. 1 is a diagram showing an entire block configuration of a road surface condition estimation apparatus according to a first embodiment.
Figure 2:
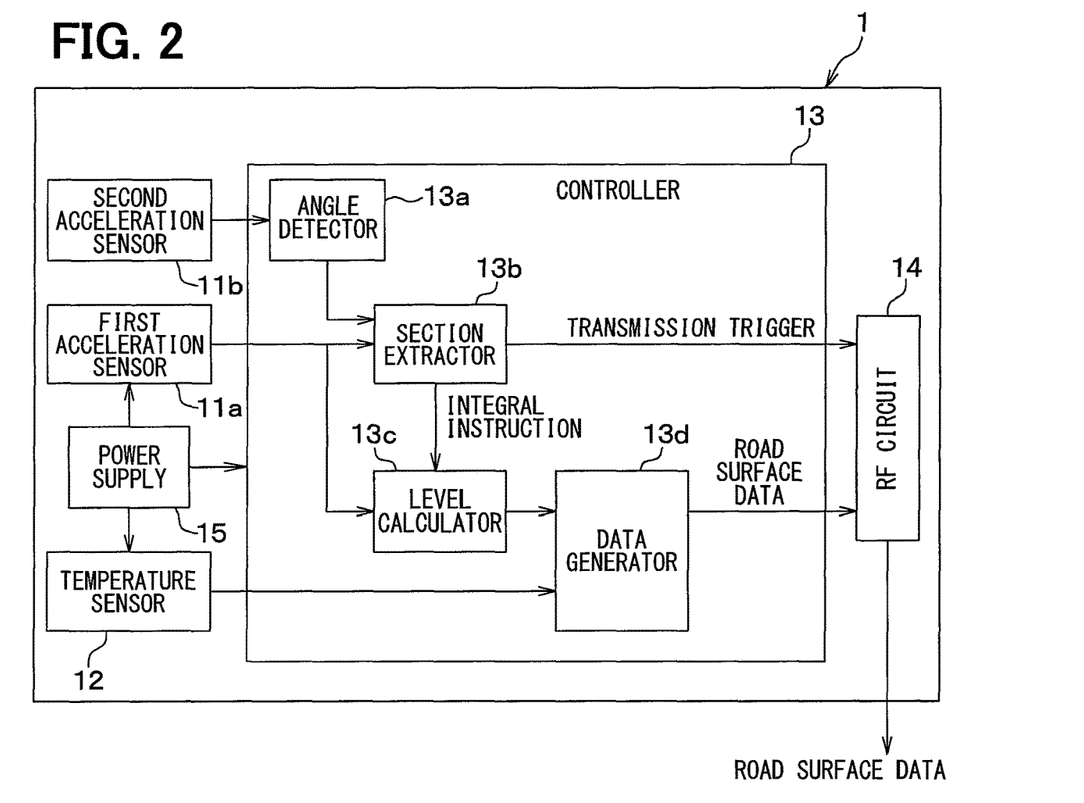
FIG. 2 is a block diagram of the tire-mounted sensor.

As shown in FIG. 1 and FIG. 2, the road surface condition estimation apparatus 100 has a tire-mounted sensor 1 attached to each wheel side and a vehicle body system 2 including various devices mounted in a vehicle body. The vehicle body system 2 includes, for example, a transceiver 21 and a notifier 22.

In the road surface condition estimation apparatus 100, the tire-mounted sensor 1 transmits data representing a road surface state during travel, such as data indicating a road surface μ between a tire 3 and the road surface being traveled. Hereinafter, the data of the road surface μ is referred to as μ data and the data representing the road surface condition such as the μ data is referred to as road surface data.

The road surface condition estimation apparatus 100 receives the road surface data transmitted from the tire-mounted sensor 1 by the transceiver 21 and conveys the road surface condition indicated by the road surface data from the notifier 22. It is thus made possible to notify the driver of the road surface condition, for example, that the road surface μ is low, and the road surface is dry, wet or frozen. It is also made possible to warn the driver if the road surface is wet. Specifically, the tire mount sensor 1 and the receiver 21 are configured as follows.

Figure 3:
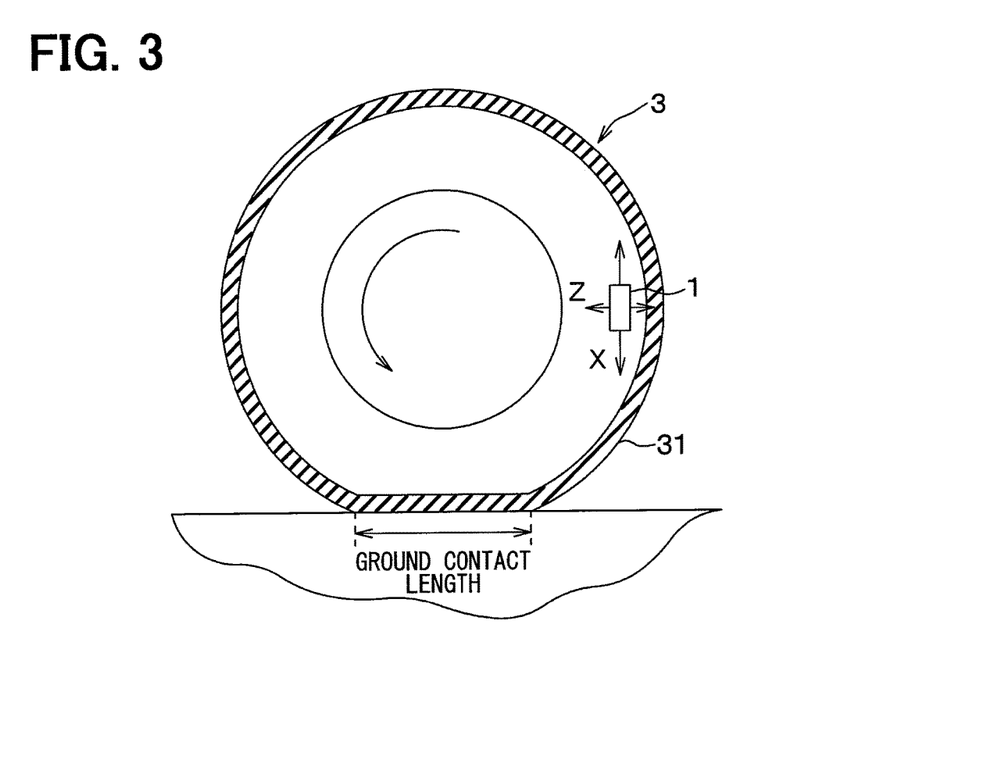
FIG. 3 is a regional schematic view of a tire to which the tire-mounted sensor is attached.

The tire-mounted sensor 1 is a tire-side device provided at a tire. The tire-mounted sensor 1 is a tire-side device provided at a tire. As shown in FIG. 2, the tire-mounted sensor 1 includes a first acceleration sensor 11a, a second acceleration sensor 11b, a temperature sensor 12, a controller 13, an RF circuit 14, and a power supply 15. As shown in FIG. 3, the tire mount sensor 1 is provided at a rear side area of a tread 31 of the tire 3.

The acceleration sensor 11 includes a vibration detector that detects vibration applied to the tire. For example, the acceleration sensor 11 outputs a detection signal of acceleration. The detection signal corresponds to vibration in a direction in contact with a circular orbit drawn by the tire mount sensor 1 when the tire 3 rotates. That is, the detection signal corresponds to vibration in a tire tangential direction shown by an arrow X in FIG. 4. For more details, the first acceleration sensor 11a generates as the detection signal an output voltage, which is positive in one direction and negative in the opposite direction, between two directions indicated with the arrow X.

The second acceleration sensor 11b is used for detecting the rotational angle of the tire 3. For example, the second acceleration sensor 11b outputs a detection signal based on acceleration in the centrifugal direction of the tire 3. In other words, the second acceleration sensor 11b outputs a detection signal based on acceleration in the tire's radial direction indicated by an arrow Z in FIG. 3. For more details, the second acceleration sensor 11b generates as the detection signal an output voltage, which is positive in one direction and negative in the opposite direction, between two directions indicated with the arrow Z.

The temperature sensor 12 outputs a detection signal corresponding to the temperature. The temperature sensor 12 measures the temperature of the traveling road surface by detecting the temperature of the position of the tire 3 to which the tire mount sensor 1 is attached.

The controller 13 is a signal processor. The controller 13 operates to generate road surface data by using the detection signal of the first acceleration sensor 11a as a detection signal, which indicates the vibration data in the tire-tangential direction, and processing this detection signal, and sends the road surface data to the RF circuit 14. Specifically, the controller 13 extracts a ground-contact section of the first acceleration sensor 11a during rotation of the tire 3 based on the detection signal of the first acceleration sensor 11a, that is, a time change of the output voltage of the first acceleration sensor 11a. The ground contact section refers to a section in which a part of the tread 31 of the tire 3 corresponding to the position of the first acceleration sensor 11a is in contact with the road surface. In the present embodiment, the location of arrangement of the first acceleration sensor 11a corresponds to the location of arrangement of the tire-mounted sensor 1, so that the ground contact section has the same meaning as a section in which the part of the tread 31 of the tire 3 corresponding to the position of the tire-mounted sensor 1 is in contact with the road surface.

Since high frequency components included in the detection signal of the first acceleration sensor 11a generated in a period of the ground contact zone indicate the road surface condition, the controller 13 extracts the high frequency components from the detection signal and detects the road surface condition such as the road surface μ based on the extracted high frequency components.

The estimation of road surface is performed based on a detection signal of the first acceleration sensor 11a during the ground contact section. However, when a vehicle travels on a bumpy road surface such as a gravel road, the vibration as a noise caused by an uneven shape of the road surface is superimposed to the detection signal. Thus, it is difficult to acquire the vibration only during the ground contact section. With regard to the present embodiment, the rotational angle of the tire 3 is detected and the ground contact section is accurately detected based on a detection signal of the second acceleration sensor 11b.

With regard to the present embodiment, the temperature sensor 12 measures the temperature of a traveling road surface. The controller 13 detects a road surface condition based on the temperature of the travelling road surface, and corrects the road surface condition evaluated from high-frequency components of the detection signal of the first acceleration sensor 11a.

The controller 13, thus detecting the road surface condition, generates the road surface data indicating the road surface condition and executes processing of sending it to the RF circuit 14. As a result, the RF circuit 14 transmits the road surface data to the receiver 21.

The controller 13 is provided by a microcomputer including a CPU, a ROM, a RAM, an I/O and the like and executes the processing for detecting the road surface condition based on a program stored in the ROM or the like. The controller 13 includes, as a functional device for executing such processing, angle detector 13a, a section extractor 13b, a level calculator 13c and a data generator 13d.

The angle detector 13a detects a situation where the rotational angle of the tire 3 is the angle of ground contact based on the detection signal of the second acceleration sensor 11b. The rotational angle of the tire 3 is an angle indicating the position of the tire-mounted sensor 1 in the circumferential direction around the axle. The ground contact angle refers to an angular range where the part of the tread 31 provided with the tire-mounted sensor 1 is in contact with the ground. In other words, it refers to an angular range in the ground contact section.

The detection signal of the second acceleration sensor 11b includes the gravitational acceleration as a component in addition to the centrifugal acceleration of the tire 3 due to acceleration and deceleration of the vehicle. The centrifugal acceleration is a linear change occurring along with acceleration and deceleration of the vehicle, and appears as a change in DC component in the detection signal. On the other hand, the gravitational acceleration is a change in the vibration waveform with one rotation of the tire 3 as one cycle, and appears as a change in a vibration component in the detection signal. The gravitational acceleration indicates the change corresponding to the rotational angle of the tire 3.

Figure 4:
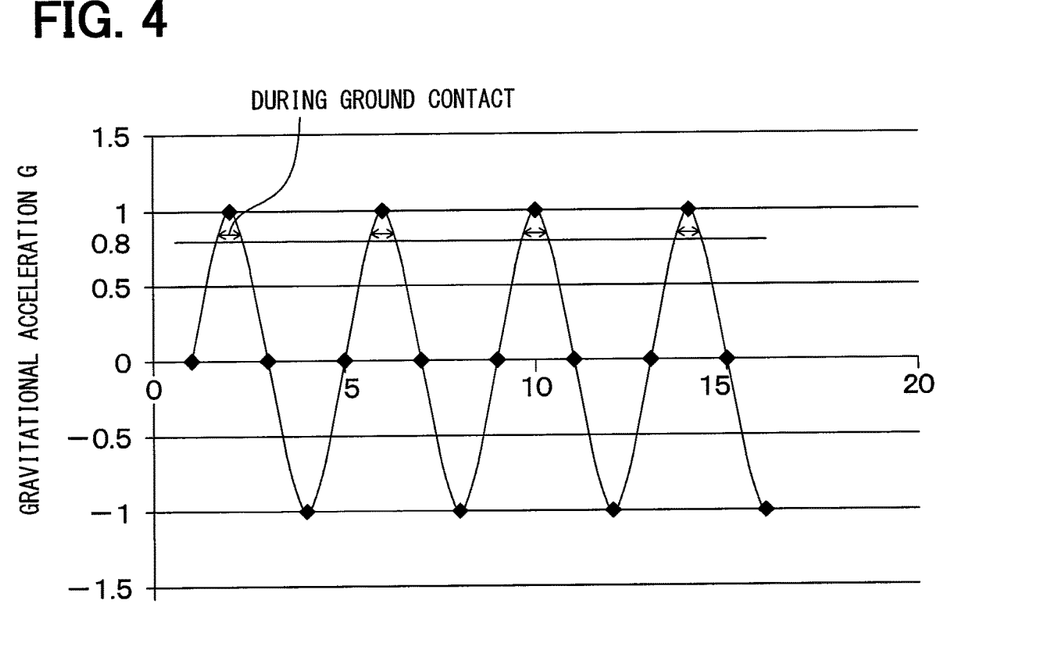
FIG. 4 is a waveform diagram related to a gravitational acceleration component extracted from a detection signal of a second acceleration sensor.

For example, the detection signal of the second acceleration sensor 11b indicates a positive value when the acceleration acts outwardly in the radial direction of the tire 3 with respect to the second acceleration sensor 11b, and indicates a negative value when the acceleration acts inwardly in the radial direction of the tire 3 with respect to the second acceleration sensor 11b. In this situation, a waveform in which the centrifugal acceleration as a DC component is removed from the detection signal of the second acceleration sensor 11b is generated. A vibration waveform is illustrated in FIG. 4. The gravitational acceleration is 0G when the tire-mounted sensor 1 is at the center of the tire 3. In other words, the gravitational acceleration is 0G when the tire-mounted sensor 1 is at the same height position as the axle. The gravitational acceleration is −1G when the tire-mounted sensor 1 is located above the tire 3. The gravitational acceleration is 1G when the tire-mounted sensor is located below the tire 3.

When the gravitational acceleration component is extracted from the detection signal of the second acceleration sensor 11b, it can be detected that which angle of the tire 3 the tire-mounted sensor 1 is located at. The ground contact angle refers to the ground contact section in a situation where the tire-mounted sensor 1 is located below the tire 3. When the gravitational acceleration component indicated by the detection signal of the second acceleration sensor 11b is closed to 1G, the ground contact angle is formed. Accordingly, the angle detector 13a extracts the gravitational acceleration component of the detection signal of the second acceleration sensor 11b, and then determines a period where the ground contact angle may be formed in a situation where the gravitational acceleration is larger than or equal to a predetermined threshold value, for example, 0.8 G or larger as illustrated in FIG. 4. Subsequently, the angle detector 13a determines a period where the ground contact angle may be formed, the angle detector 13a informs the section extractor 13b of the measurement period.

Figure 5:
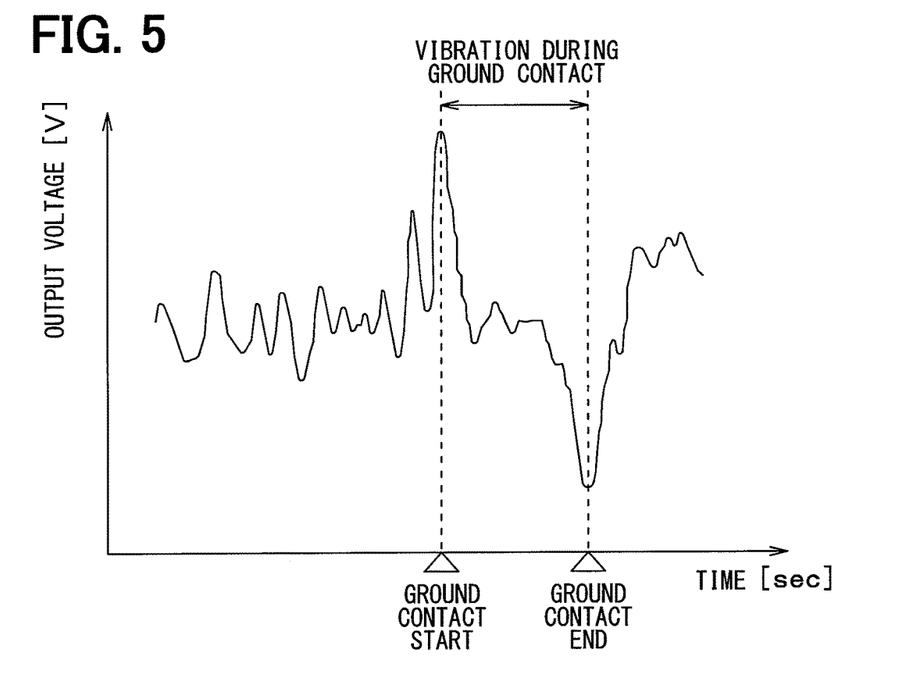
FIG. 5 is a diagram showing an output voltage waveform of an acceleration sensor during tire rotation on a flat road.

The section extractor 13b extracts the ground contact section by detecting a peak value of the detection signal indicated by the output voltage of the first acceleration sensor 11a. The ground contact section is extracted during the measurement period, which is informed by the angle detector 13a. For example, the output voltage waveform of the first acceleration sensor 11a during the tire rotation is shown in FIG. 5. As shown in FIG. 5, the output voltage of the acceleration sensor 11 has a maximum value at the ground contact starting time when the portion of the tread 31 of the tire 3 corresponding to the position of the acceleration sensor 11 starts to have a contact with the ground with the rotation of the tire 3. The section extractor 13a detects the ground contact starting time, at which the output voltage of the first acceleration sensor 11a takes the maximum value, as a first peak value time. As shown in FIG. 4, the output voltage of the acceleration sensor 11 has a minimum value at the ground contact ending time when the portion of the tread 31 of the tire 3 corresponding to the position of the acceleration sensor 11 is changed from a state of having a contact with the ground to a state of not having a contact with the ground with the rotation of the tire 3. The section extractor 13b detects the ground contact ending time, at which the output voltage of the first acceleration sensor 11a takes the minimum value, as a second peak value time.

The reason why the output voltage of the acceleration sensor 11 has peak values at the above time is described in the following section. When the portion of the tread 31 corresponding to the position of the first acceleration sensor 11a is in contact with the ground with the rotation of the tire 3, a portion of the tire 3, which had a substantially cylindrical surface, is pressed to be deformed into a flat shape in the vicinity of the first acceleration sensor 11a. Upon receiving the impact at this time, the output voltage of the first acceleration sensor 11a has the first peak value. When the portion of the tread 31 corresponding to the position of the first acceleration sensor 11a is separated from the ground with the rotation of the tire 3, the pressing of the portion of the tire 3 is released in the vicinity of the first acceleration sensor 11a, and the flat shape of the portion of the tire 3 returns to the substantially cylindrical shape. Upon receiving the impact when the shape of the tire 3 returns to the original shape, the output voltage of the first acceleration sensor 11a has the second peak value. In this way, the output voltage of the first acceleration sensor 11a has the first peak value and the second peak value at the ground contact starting time and the ground contact ending time, respectively. Since a direction of impact when the tire 3 is pressed and a direction of impact when the tire 3 is released from pressurization are opposite, polarities of the output voltages are also opposite.

The section extractor 13b extracts the ground contact section of the first acceleration sensor 11a by extracting the data of the detection signal including the times of the first peak value and the second peak value and sends the data that it is within the ground contact section to the level calculator 13c.

Figure 6:
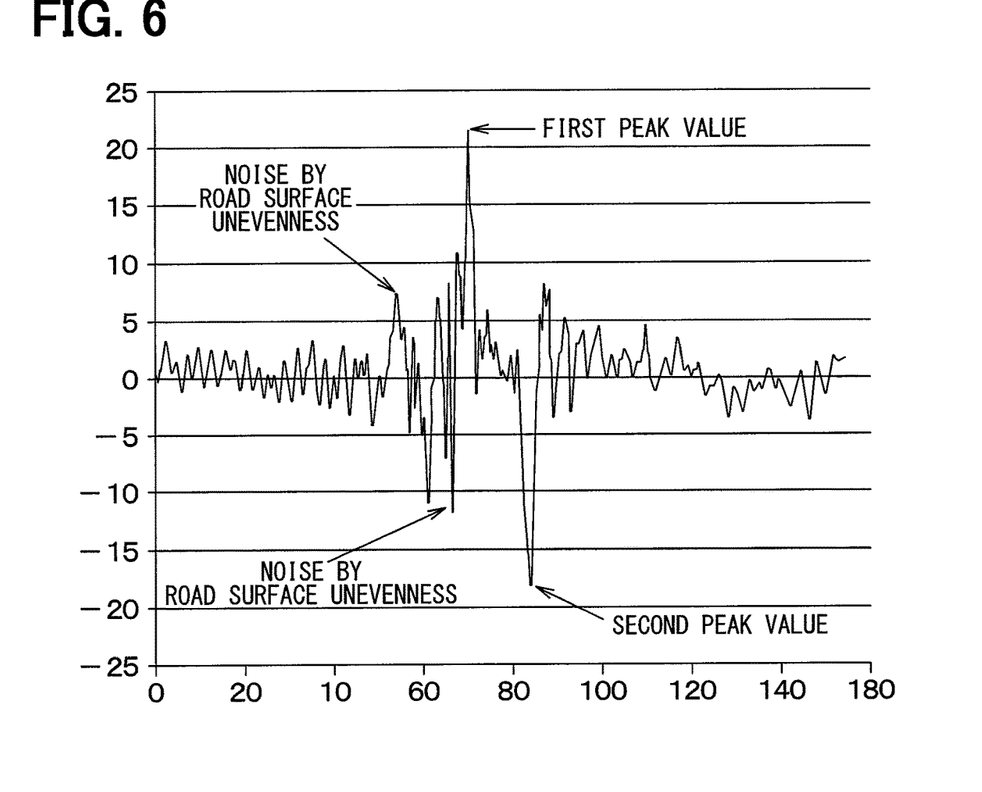
FIG. 6 is a diagram showing an output voltage waveform of an acceleration sensor during tire rotation on a bumpy road.

As described above, the angle detector 13a determines a period in which a ground contact angle may be formed, and the section extractor 13b extracts the ground contact section during this period as the measurement period. Even though noise of vibration, which is caused by a bumpy road surface, may be superimposed to a detection signal of the first acceleration sensor 11a, it is possible to suppress erroneous determination on the ground contact section. In other words, as illustrated in FIG. 6, when a vehicle travels on a bumpy road surface having large unevenness, the noise of vibration caused by the bumpy surface is larger compared to the situation where the vehicle travels on the surface of an asphalt road as illustrated in FIG. 5. Thus, large nose may be detected as the first peak value or the second peak value. However, in the present embodiment, the angle detector 13a sets the measurement period. Thus, noise of vibration caused by the bumpy road surface is prevented to be detected as the first peak value or the second peak value. Thus, it may be possible to suppress an erroneous determination on the ground contact section even when a vehicle travels on a bumpy road surface.

Since the output voltage of the first acceleration sensor 11a takes the second peak value at the ground contact ending time of the acceleration sensor 12, the section extractor 13b transmits a detection signal to the RF circuit 14 at this time. As a result, the RF circuit 14 transmits the road surface data such as the μ data generated by the data generator 13d as described later. Accordingly, since the data transmission by the RF circuit 14 is not always performed, but only at the ground contact ending time of the acceleration sensor 11, the power consumption can be reduced. Although the time at which the output voltage of the first acceleration sensor 11a takes the second peak value is exemplified to be the data transmission time from the RF circuit 14, the data transmission time may be other times. Further, instead of performing data transmission once every rotation of the tire 3, the data may be transmitted once every plural rotations or plural times per rotation.

When it is sent from the section extractor 13b that it is within the ground contact section, the level calculator 13c calculates a level of the high frequency components, which arise from vibrations of the tire 3 and is included in the output voltage of the first acceleration sensor 11a during the interval of the ground contact section. The level calculator 13c sends such a calculation result to the data generator 13d as the road surface data such as the μ data. The level of the high frequency components is calculated as an index indicating the road surface state such as the road surface μ for the following reasons described below with reference to FIG. 7A, FIG. 7B and FIG. 8.

Figure 7A:
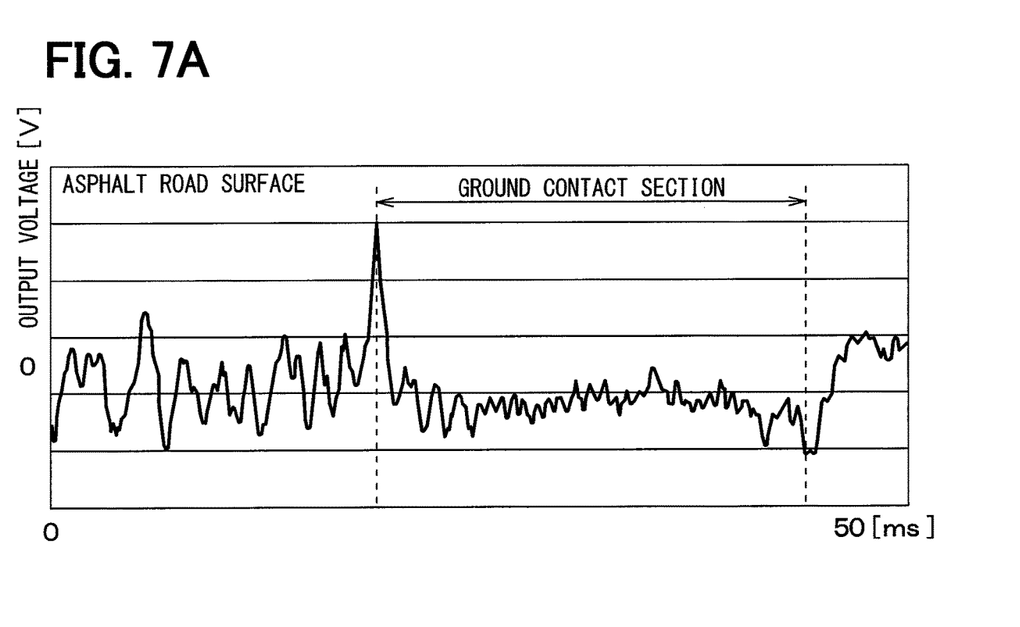
FIG. 7A is a chart showing a change in an output voltage of the acceleration sensor in case of traveling on a high μ road surface such as an asphalt road, a road surface μ of which is comparatively higher.
Figure 7B:
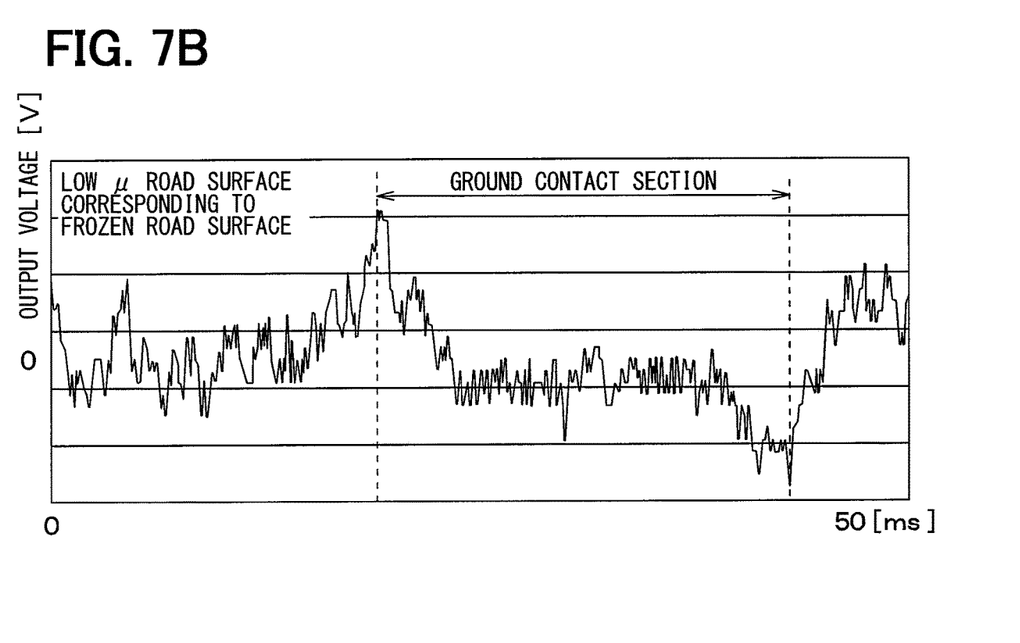
FIG. 7B is a chart showing a change in the output voltage of the acceleration sensor in case of traveling on a low μ road surface such as a frozen road, a road surface μ of which is comparatively lower.

FIG. 7A shows a change of the output voltage of the first acceleration sensor 11a in case of traveling on the high μ road surface like an asphalt road, the road surface μ of which is comparatively large. FIG. 7B shows a change of the output voltage of the first acceleration sensor 11a in case of traveling on the low μ road surface like a road corresponding to a frozen road, the road surface μ of which is comparatively small.

As is evident from those figures, the first peak value and the second peak value appear at the start and the end of the ground contact section, that is, the ground contact starting time and the ground contact ending time of the first acceleration sensor 11a, respectively, regardless of the road surface μ. However, the output voltage of the first acceleration sensor 11a changes as affected by the road surface μ. For example, in case that the road surface μ is lower like traveling on the low μ road surface, fine high frequency vibrations caused by slipping of the tire 3 are superimposed on the output voltage. This fine high frequency noise caused by slipping of the tire 3 is not superimposed so much in case that the road surface μ is higher like traveling on the higher μ road surface.

Figure 8:
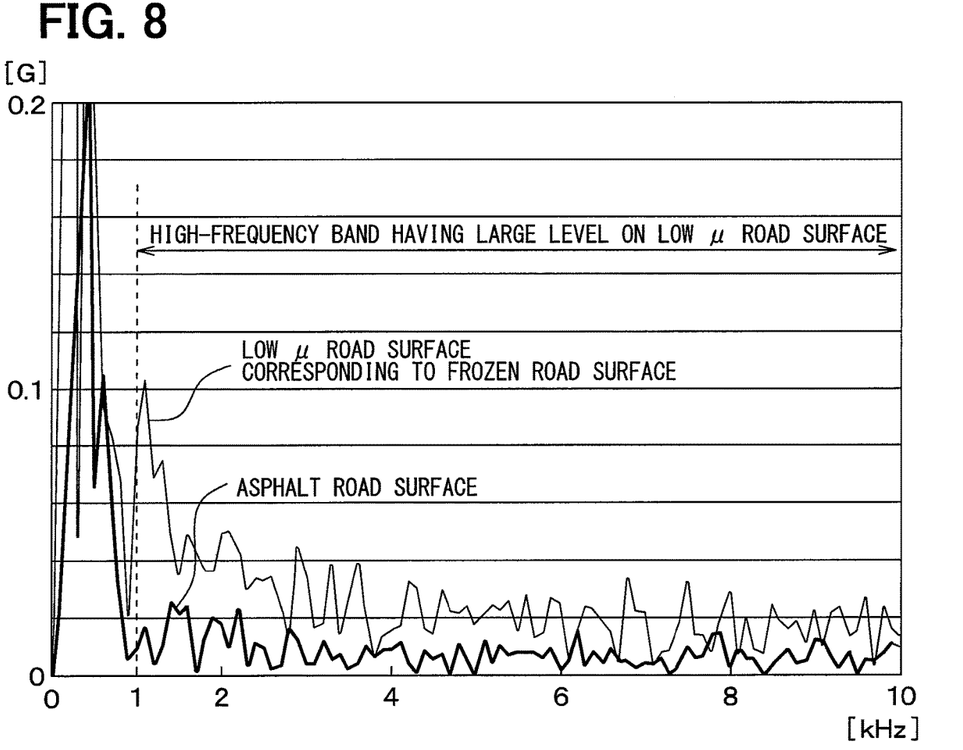
FIG. 8 is a diagram showing a result of frequency analysis performed on the output voltage during a contact section with respect to each case of traveling on the high μ road and the low μ road.

For this reason, frequency analysis of the output voltage in the ground contact section with respect to the higher road surface μ and lower road surface μ produces results shown in FIG. 8. That is, in a low frequency band, the level is high regardless of traveling on the high μ road or on the low μ road. However, in a high frequency band of 1 kHz or more, the level is higher in case of the low road surface μ than in case of the high road surface μ. For this reason, the level of the high frequency components of the output voltage of the first acceleration sensor 11a is the index indicating the road surface condition.

Therefore, by calculating the level of the high frequency components of the output voltage of the first acceleration sensor 11a in the ground contact section by the level calculator 13c, it is possible to use the calculated level as the μ data. Further, it is possible to detect a type of the road surface corresponding to the road surface μ as the road surface condition. For example, it is possible to determine the frozen road when the road surface μ is low.

For example, the high frequency component level is calculated as an integrated voltage value by extracting the high frequency components from the output voltage of the acceleration sensor 12 and integrating the high frequency components extracted during the interval of the ground contact zone. Specifically, the high frequency components of the frequency band fa to fb, in which it is assumed to change in correspondence to the road surface condition or the road surface μ, are extracted by filtering or the like and a voltage of the high frequency components in the frequency band fa to fb extracted by the frequency analysis is integrated to acquire the integrated voltage value. For example, the integrated voltage value is acquired by charging a capacitor (not shown). Thus the charge amount is greater in case that the road surface μ is low like traveling on the low μ road surface than in case that the road surface μ is high like traveling on the high μ road surface. By thus using the charge amount as the μ data, it is possible to estimate the road surface μ is lower as the charge amount indicated by the μ data is greater.

The data generator 13d basically generates the road surface data based on the calculation result of the level calculator 13d. For example, the data generator 13d uses the μ data as it is as the road surface data or generates data as the road surface data by determining the road surface condition like the frozen road or the asphalt road based on the μ data.

Further, as described above, in the present embodiment, the temperature of the traveling road surface is measured by the temperature sensor 12. The data generator 13d acquires a road surface temperature by receiving an input of the detection signal of the temperature sensor 12, and detects the type of road surface based on the acquired road surface temperature, and performs the correction of μ data or the correction of the type of road surface based on the acquired μ data.

For example, when the road surface temperature detected by the temperature sensor 12 is lower than 0° C., the data generator 13d detects that the road surface is in a frozen condition as the type of road surface. Furthermore, when μ data evaluated from the high frequency components of the detection signal of the first acceleration sensor 11a or the type of road surface indicated by the μ data does not correspond to the road surface temperature detected by the temperature sensor 12, the data generator 13d corrects the data and does not adopt this data as the detection result of road surface condition. For example, when the type of road surface evaluated from the high frequency components of the detection signal of the first acceleration sensor 11a is in a frozen state while the temperature sensor 12 detects the road surface temperature at 40° C., it is considered that there is an error in the detection result for determining the type of road surface in a frozen state. In this situation, the data generator 13d does not adopt the result sent from the level calculator 13c as a detection result for determining the type of road surface. Similarly, when the road surface μ indicated by the μ data does not correspond to the type of road surface based on the road surface temperature, the road surface μ indicated by the μ data is corrected to a value lower than the value before correction when the road surface μ indicated by the μ data is high in a situation where the frozen state is detected based on the road surface temperature.

The RF circuit 14 includes a transmitter, which transmits to the transceiver 21 the road surface data such as the μ data sent from the data generator 13d. Communication between the RF circuit 14 and the receiver 21 can be implemented by a short-distance wireless communication technology such as Bluetooth (registered trademark), for example. Although the time of transmitting the road surface data is arbitrary. In the present embodiment, as described above, when the transmission trigger is sent from the section extractor 13b at the ground contact ending time of the first acceleration sensor 11a, the road state data is transmitted from the RF circuit 14. Accordingly, since the data transmission by the RF circuit 14 is not always performed, but only at the ground contact ending time of the acceleration sensor 11, the power consumption can be reduced.

The road surface data is transmitted together with the individual identification information (hereinafter referred to as ID information) of each wheel which is provided in advance for each tire 3 of the vehicle. The position of each wheel can be identified by a wheel position detecting device that detects where the wheel is mounted on the vehicle. By transmitting the road surface data together with the ID information to the transceiver 21, it is possible to determine the wheel to which the road surface state data corresponds.

The power supply 15 is formed of a battery, for example, and supplies power to drive each component of the tire-mounted sensor 1.

The transceiver 21 receives the road surface data transmitted from the tire-mounted sensor 1, estimates the road surface condition based on the received road surface data, sends the estimated road surface condition to the notifier 22 and notifies of, if necessary, the road surface condition to a driver from the notifier 22. Thus, the driver tries to drive the vehicle in a manner matching the road surface condition and is possible to avoid potential danger to the vehicle. For example, the estimated road surface state may be displayed always by the notifier 22 or the road surface condition may be displayed to warn the driver only when the vehicle need be driven more carefully than usual, for example, when the estimated road surface condition corresponds to the low μ road like the wet road or the frozen road. Further, by transmitting the road surface condition to an electronic control unit (hereinafter referred to as ECU) for vehicle motion control, for example, ECU for brake control, from the transceiver 21, the vehicle motion control can be attained based on the transmitted road surface condition.

The notifier 22 is configured with a meter display device for example and used to notify the driver of the road surface state. In case that the notifier 22 is configured with the meter display device, it is located at a position which the driver is capable of recognition during driving of the vehicle, for example, within an instrument panel in the vehicle. When the road surface condition is transmitted from the transceiver 21, the meter display device visually notifies the driver of the road surface state by performing display in such a manner that the condition of the road surface can be grasped.

The notifier 22 may alternatively be configured with a buzzer or a voice guidance device. In such a case, the notifier 22 notifies the driver of the road surface state audibly by buzzer sound or voice guidance. Although the meter display device has been exemplified as the notifier 22 providing visual notification, the notifier 22 may be configured with a display device that displays information such as a head up display.

The road surface condition estimation apparatus 100 is configured as described above in the present embodiment. Each device forming the vehicle body system 2 is connected through an in-vehicle LAN (Local Area Network) like CAN (Controller Area Network) communication. Therefore, each part can communicate information with each other through the in-vehicle LAN.

Figure 9:
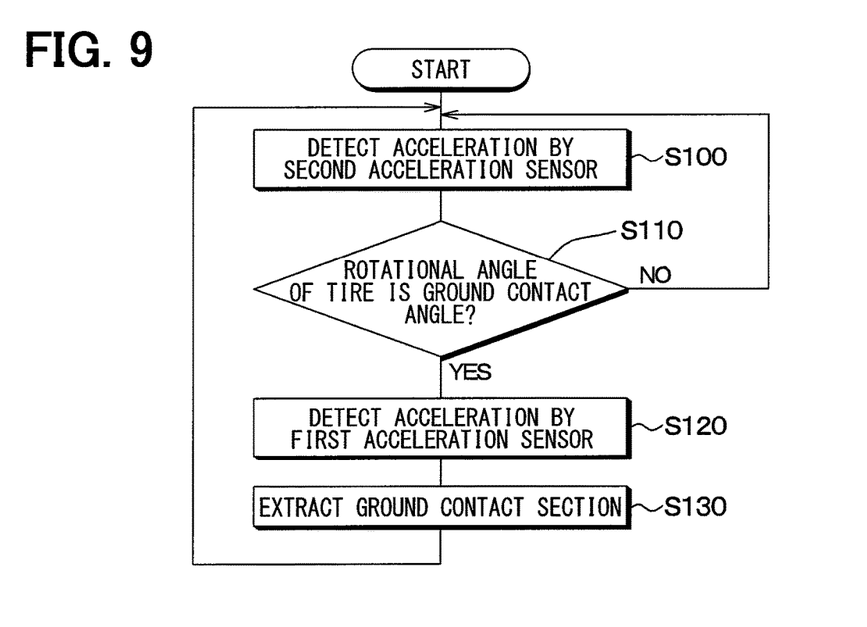
FIG. 9 is a flowchart showing an entire process executed systematically by the tire-mounted sensor.

An operation of the tire-mounted sensor 1 in the road surface condition estimation apparatus 100 will be described next. FIG. 9 is a flowchart showing an entire process executed systematically by the tire-mounted sensor 1.

With regard to the tire-mounted sensor 1 at each wheel, the second acceleration sensor 1b detects an acceleration of the tire 3 in a centrifugal direction based on the power supply from the power supply 15 as shown in step S100. As shown in step S110, the angle detector 13a determines whether the rotational angle of the tire 3 is at the ground contact angle based on the detection signal of the second acceleration sensor 11b. In particular, the gravitational acceleration component is extracted from the detection signal of the second acceleration sensor 11b. When the gravitational acceleration is larger than or equal to a predetermined threshold value, for example, 0.8 G, it is determined that the rotational angle of the tire 3 is at the ground contact angle. If it is determined that the rotational angle of the tire 3 is at the ground contact angle, then the process is shifted to step S120. On the other hands, if it is determined that the rotational angle of the tire 3 is not at the ground contact angle, the process is shifted back to step S100.

In step S120, the controller 13 starts detecting vibration based on the detection signal of the first acceleration sensor 11a. In step S130, the first peak value and the second peak value are detected based on the detection signal of the first acceleration sensor 11a to extract the ground contact section.

By repeating the above operation, it is possible to accurately obtain the vibration in the ground contact section from the detection signal of the first acceleration sensor 11a. The subsequent processes are not shown. However, when the vibration is obtained from the ground contact section, the road surface condition is detected based on the vibration and then the road surface data is generated. The road surface data is sent to the receiver 21 through the RF circuit 14. After the road surface data is received by the receiver 21, the road surface condition is estimated based on the road surface data, and the estimated road surface condition is transmitted to the notifier 22. When the rotational angle of the tire 3 is no longer at the ground contact angle, the first acceleration sensor 11a does not perform vibration detection until the rotational angle of the tire is at the ground contact angle.

As described above, with regard to the road surface condition estimation apparatus 100 according to the present embodiment, the ground contact section is extracted based on a detection signal of the first acceleration sensor 11a only in a period of a contact angle based on the rotational angle of the tire 3. Even though noise of vibration, which is caused by a bumpy road surface, may be superimposed to a detection signal of the first acceleration sensor 11a, it is possible to suppress erroneous determination on the ground contact section. Thus, it may be possible to suppress an erroneous determination on the ground contact section even when a vehicle travels on a bumpy road surface.

Second Embodiment

The following describes a second embodiment. The present embodiment is different from the first embodiment in the configuration of the angle detector 13a, and the other parts are similar to the first embodiment, so only the difference from the first embodiment will be described.

In the first embodiment, the angle detector 13a detects a situation where the acceleration, which is indicated by the detection signal of the second acceleration sensor 11b, is larger than or equal to a predetermined threshold value as a rotational angle is at the ground contact angle. In the present embodiment, the angle detector 3a detects the rotational angle being at the ground contact angle based on the acceleration and the wheels' velocity indicated by the detection signal of the second acceleration sensor 11b.

A waveform in which the centrifugal acceleration as a DC component is removed from the detection signal of the second acceleration sensor 11b is generated. A vibration waveform is illustrated in FIG. 4. The cycle of the vibration waveform is amplitude corresponding to the velocity of the tire 3. As the velocity of the tire 3 is determined, the time until the rotational angle of the tire 3 being at the ground contact angle is determined. In the present embodiment, the presumed time period until reaching the ground contact angle is calculated based on the time where the acceleration reaches the predetermined value such as 0G and the velocity of the tire 3. The acceleration is regarded as a value during which the rotational angle of the tire 3 reaches the ground contact angle. Subsequently, the measurement period is set to include the above-mentioned presumed time period so as to notify to the section extractor 13b of the measurement period being in progress.

For example, the acceleration is in increase from the value of 0G, and the rotational angle of the tire 3 is at the contact angle until the acceleration again reaching 0G. In this situation, when the acceleration reaches 0G from a negative value, the presumed time period until the rotational angle of the tire 3 again reaching the ground contact angle is calculated based on the velocity of the tire 3. With regard to the velocity of the tire 3, the velocity is calculated based on, for example, a time interval from the previous acceleration at 0G to the current acceleration at 0G or a time period of one cycle of the amplitude of acceleration such as the time interval between both of maximum values of the amplitude of acceleration. If the calculated velocity of the tire 3 is, for example, 100 km/h, it is presumed that it takes 25 milliseconds to reach the next ground contact angle. Thus, the time period including the time required to reach the ground contact angle may be set, for example, 20 to 30 milliseconds as the measurement period.

The angle detector 3a can also detect the rotational angle being at the ground contact angle based on the acceleration and the wheels' velocity indicated by the detection signal of the second acceleration sensor 11b. Even with such a structure, the same effect as in the first embodiment can be obtained.

Other Embodiments

Although the present disclosure is described based on the above embodiments, the present disclosure is not limited to the embodiments. Various changes and modifications may be made in the present disclosure. Furthermore, various combination and formation, and other combination and formation including one, more than one or less than one element may be made within the spirit and scope of the present disclosure.

For example, in the embodiments described above, the ground contact section is specified from the detection signal of the first acceleration sensor 11a forming the vibration detector and the calculation result of the level of the high frequency components in the detection signal in the ground contact section is used as the road surface data. However, this is only one example of a method of detecting the road surface condition using the detection signal of the vibration detector. The road surface condition may be detected by any other methods which use the detection signal of the vibration detector. Although the vibration detector is formed exemplarily of the first acceleration sensor 11a, the vibration detector may be configured by any other vibration detection elements, for example, a piezoelectric element or the like. In addition, the power supply 15 is not limited to a battery but may be configured of a power generating device or the like. For example, in case of a vibration detector, it may be used to form not only the vibration detector but also the power supply 15.

With regard to the above-mentioned embodiment, the road surface data indicates μ data or road surface condition, in particular, the type of road surface. However, the data indicates road surface condition is also acceptable. In addition, the data indicating the first peak value to the second peak value of the voltage waveform output from the vibration detector may also be utilized.

With regard to the above-mentioned embodiment, the receiver 21 acts as a controller to receive the road surface data and notify of the road surface condition to the notifier 22. However, these are only examples, and a controller may be provided separately from the receiver 21, or another ECU such as the engine ECU 22 or the brake ECU 23 may function as the controller.

The invention claimed is:
1. A tire-mounted sensor mounted to a rear surface of a tread of a tire, the tire-mounted sensor comprising:
a vibration detector configured to output a detection signal according to amplitude of a vibration of the tire;
an acceleration sensor configured to output a detection signal according to an acceleration of the tire in a radial direction;
a signal processor that is configured to
detect a rotational angle of the tire reaching a ground angle in which a portion of the tread provided with the vibration detector is in contact with a ground during each rotation of the tire,
set a measurement period including a time period during which the rotational angle of the tire is at the ground angle,
extract a ground contact section, which refers to a time period during which the portion of the tread provided with the vibration sensor is in contact with the ground, in the measurement period, and
generate a road surface data, which indicates a road surface condition based on the detection signal output from the vibration detector, during the ground contact section; and
a transmitter configured to transmit the road surface data, wherein:
the acceleration sensor is further configured to output the detection signal having a positive value when the acceleration of the tire is in an outward radial direction with reference to the tire, and is further configured to output the detection signal having a negative value when the acceleration of the tire is in an inward radial direction with reference to the tire;
the acceleration of the tire further includes a gravitational acceleration; and
the signal processor is further configured to extract a value of the gravitational acceleration from the detection signal output from the acceleration detector, detect the rotational angle of the tire reaching the ground angle in response to the value of the gravitational acceleration being larger than or equal to a predetermined threshold value, and set the measurement period.

2. A road surface condition estimation apparatus, comprising:

the tire-mounted sensor according to claim 1; and a vehicle body system at a vehicle body and having a controller, wherein the controller is configured to receive the road surface data from the transmitter, and to estimate a road surface condition based on the road surface data.

3. A tire-mounted sensor mounted to a rear surface of a tread of a tire, the tire-mounted sensor comprising:

a vibration detector configured to output a detection signal according to amplitude of a vibration of the tire;

an acceleration sensor configured to output a detection signal according to an acceleration of the tire in a radial direction;

a signal processor that is configured to detect a rotational angle of the tire reaching a ground angle in which a portion of the tread provided with the vibration detector is in contact with a ground during each rotation of the tire, set a measurement period including a time period during which the rotational angle of the tire is at the ground angle, extract a ground contact section, which refers to a time period during which the portion of the tread provided with the vibration sensor is in contact with the ground, in the measurement period, and generate a road surface data, which indicates a road surface condition based on the detection signal output from the vibration detector, during the ground contact section; and a transmitter configured to transmit the road surface data, wherein:

the acceleration sensor is further configured to output the detection signal having a positive value when the acceleration of the tire is in an outward radial direction with reference to the tire, and is configured to output the detection signal having a negative value when the acceleration of the tire is in an inward radial direction with reference to the tire;

the acceleration of the tire further includes a gravitational acceleration; and the signal processor is further configured to extract a value of the gravitational acceleration from the detection signal output from the acceleration detector, detect the rotational angle of the tire reaching the ground angle after a predetermined time period has been elapsed from a moment when the value of the gravitational acceleration reaches a predetermined value, and set the measurement period.

4. The tire-mounted sensor according to claim 3, wherein:

the signal processor is further configured to obtain a velocity of the tire based on a change in the value of the gravitational acceleration extracted from the detection signal output from the acceleration sensor, and to set the predetermined time period from a moment when the value of the gravitational acceleration reaches the predetermined value until a moment of detecting the rotational angle of the tire reaching the ground angle.

* * * * *